United States Patent [19]

Erhardt

[11] Patent Number: 4,686,574

[45] Date of Patent: Aug. 11, 1987

[54] LINE-SEQUENTIAL READ OUT OF A PHOTOTSENSOR ARRAY VIA A CCD SHIFT REGISTER CLOCKED AT A MULTIPLE OF PIXEL SCAN RATE

[75] Inventor: Harry G. Erhardt, East Windsor, N.J.

[73] Assignee: RCA Corporation, Princeton, N.J.

[21] Appl. No.: 848,223

[22] Filed: Apr. 4, 1986

[51] Int. Cl.[4] .............................................. H04N 3/14
[52] U.S. Cl. ........................... 358/213.26; 358/213.18; 357/24
[58] Field of Search .............................. 358/213, 221; 357/24 LR

[56] References Cited

U.S. PATENT DOCUMENTS

| | | | |
|---|---|---|---|
| 3,683,193 | 8/1972 | Weimer | 250/209 |
| 4,242,700 | 12/1980 | Weimer | 358/44 |
| 4,496,982 | 1/1985 | Levine | 358/221 |
| 4,498,105 | 2/1985 | Crawshaw | 358/221 |
| 4,549,215 | 10/1985 | Levine | 358/213 |
| 4,607,286 | 8/1986 | Weimer | 358/213 |

*Primary Examiner*—Gene Z. Rubinson
*Assistant Examiner*—Stephen Brinich
*Attorney, Agent, or Firm*—Joseph S. Tripoli; Allen LeRoy Limberg; Thomas F. Lenihan

[57] ABSTRACT

A CCD imager has a line-transfer register the contents of which are transferred at pixel scan rate, one or two lines at a time, through a side-loaded CCD shift register forward clocked at a multiple of pixel scan rate, to an electrometer. Forward clocking the CCD shift register at higher rate than pixel scan rate reduces the differential delay between the various points of side-loading the CCD shift register, so line selection artifacts are confined to the line retrace interval. Line selection artifacts are then suppressed by normal line-retrace-interval blanking.

5 Claims, 4 Drawing Figures

CHARACTERISTICS OF LINE SELECTION CONTROL CIRCUITRY 8

CHARACTERISTICS OF LINE SELECTION CONTROL CIRCUITRY 18

LINE-SEQUENTIAL READ OUT OF A PHOTOTSENSOR ARRAY VIA A CCD SHIFT REGISTER CLOCKED AT A MULTIPLE OF PIXEL SCAN RATE

The present invention relates to solid-state imagers in which the photosensor array is read out line sequentially and, more particularly, to such imagers having line-selection artifacts constrained to occur only during line retrace intervals.

BACKGROUND OF THE INVENTION

In many solid-state imagers, a parallel array of CCD charge transfer channels stores charge packets descriptive of respective elements of an image. These elements are termed "pixels", a contraction of the phrase "picture elements". The storage of the pixels is in a column and row array, with the rows corresponding to lines of scan in the raster-scanned sample-data video output signal.

There are two basic ways to arrange the parallel array of CCD charge transfer channels, in order to facilitate the sequential transfer of the charge packets to charge sensing circuitry for their conversion to respective samples of the raster-scanned video output signal. The seemingly more natural of the two ways is to align the lengths of the charge transfer channels with the rows of the pixel array and then forward clock the charge transfer channels sequentially, one after the other, to generate raster scan.

However, the way the CCD charge transfer channels are parallelly arranged in most prior-art semiconductor imagers is the other way, with the lengths of the charge transfer channels aligned with the columns of the pixel array. The charge transfer channels are forward clocked in parallel to transfer out charge packets parallelly by row, during line retrace intervals in the raster-scanned sample-data video output signal of the solid-state imager. It is customary to load each row of charge packets transferred out parallel-in-time to respective charge transfer stages of an output CCD line register, while halting the forward clocking of that output CCD line register during its loading. (This procedure of loading directly into an intermediate charge transfer stage is referred to as "side-loading".) Then, during the line trace interval, the output CCD line register is forward clocked to transfer the charge packets serially to charge sensing circuitry for conversion to respective samples of a line of the raster-scanned video output signal. The differential time delay in the CCD circuitry for removing charge packets from successive columns of the pixel array presents no problem, because it accords with the need for providing differential time delay of successive pixels in each scan line when generating raster-scanned video signal.

The seemingly more natural method of removing charge packets from the pixel array, a row at a time via a respective charge transfer channel, is described by P. K. Weimer in U.S. Pat. No. 3,683,193 issued Aug. 8, 1972, entitled "BUCKET BRIGADE SCANNING OF SENSOR ARRAY", and assigned to RCA Corporation. Weimer describes a device using photosensors separate from the means for transferring charge packets out of the imager. The means for transferring charge packets out of the imager which Weimer specifically describes is bucket brigade circuitry, but in more modern devices charge coupled device (CCD) circuitry is used instead. These CCD imagers are an interline transfer type, with transfer being in the direction of line scan. Since line scan is customarily in the horizontal direction, these CCD imagers are sometimes referred to as being of horizontal interline transfer type.

CCD imagers which collect photocharge into packets within the row-aligned CCD charge transfer channels themselves are known and are referred to as being line transfer type. Line transfer CCD imagers are described by P. K. Weimer in U.S. Pat. No. 4,242,700 issued Dec. 30, 1980, entitled "LINE TRANSFER CCD IMAGERS", and assigned to RCA Corporation. A line transfer CCD imager has, as its image register, a line-transfer register comprising a parallel array of charge transfer channels disposed in a substrate of semiconductive material, the lengths of which charge transfer channels align with the direction of line scan of the image being televised. To implement line scanning of the image, the charge transfer channels selectively receive dynamic forward clocking signals, usually one charge transfer channel at a time.

The non-selected charge transfer channels receive static clocking signals for inducing a succession of potential barriers in those charge transfer channels. These potential barriers and the channel stops defining the sides of the charge transfer channels define charge collection sites for accumulating charge carriers generated by photoconversion of respective elements (or "pixels") of a radiant energy image impinging on the image register. The accumulation of the charge carriers generated by photoconversion in the charge transfer channels and the portions of the substrate respectively underlying them results in charge packets that sample the intensity of respective pixels of the radiant energy image.

The successive charge packets which sample successive image pixels along a scan line are transferred to a charge sensing stage, or electrometer, for conversion to voltage or current samples of a line of video signal descriptive of a respective line scan of the radiant energy image. The selection of the charge transfer channels to be forward clocked is carried out in a regularly recurrent pattern that defines frame scan.

The frame scan pattern can comprise successive fields in each of which fields each charge transfer channel in the image register is successively selected. Such frame scan pattern does not exhibit field-to-field line interlace.

Frame scan patterns that provide for field-to-field line interlace are also possible. One way to provide field-to-field line interlace is to sequentially forward clock one set of alternate charge transfer channels in the image register during odd-numbered ones of consecutively numbered successive fields of image scan, and to sequentially forward clock the other set of alternate charge transfer channels in the image register during even-numbered fields of image scan. Another frame scan pattern, which provides field-to-field pseudo line interlace, scans successive pairs of image register charge transfer channels, in one of the two possible phasings during odd-numbered fields of image scan, and in the other possible phasing during even-numbered fields of image scan.

The portion of a line transfer CCD imager (or of a CCD imager of related type) which is of concern with regard to the present invention is the CCD circuitry for conveying charge packets from the line-transfer register to the charge sensing stage. In prior art imagers this CCD circuitry includes a CCD shift register, the charge transfer channel of which is perpendicular to the charge transfer channels of the line-transfer register and abuts the ends of the line-transfer register charge transfer channels from which charge packets are transferred by forward clocking. The charge packets, transferred from the line-transfer register charge transfer channel(s) selected for forward clocking, side-load the abutting charge transfer stage(s) of the CCD shift register and are sequentially shifted to the charge sensing stage at the output end of the CCD shift register. Adjacent points in scan lines successively scanned should be separated by a 1 H delay in a normal video signal, 1 H being the combined durations of field trace interval and field retrace interval—i.e., a full line time. Where the successive line scans (in which the line-transfer register charge transfer channels are successively forward clocked) begin a full line time apart, the different delays through the CCD shift register for the charge packet output of each image register charge transfer channel causes the successive lines of charge packets to reach the charging sensing stage at intervals which differ from 1H. The response of the charge sensing stage to these lines of charge packets tends to exhibit a shearing distortion as between the successive lines of video signal. This tendency can be curbed by compensating for the differential time delay through the CCD shift register. This compensation can be provided, for example, by beginning the selective forward clocking of successive charge transfer channels in the image register on intervals progressively shorter than 1H.

There are problems that the line transfer CCD imager with a side-loaded output register has that are sufficiently serious to have prevented its acceptance as a preferred way of making a CCD imager. This, in spite of the fact that theoretically this type of CCD imager should be preferred over CCD imagers of the popular field transfer and interline transfer types having similar imaging areas, because the line transfer CCD imager takes up less area on a semiconductor substrate. A principal problem arises because the clocking signals applied to a CCD imager are coupled to the charge sensing stage, by means of capacitance between the substrate and the points of signal application. This charge sensing stage typically is an electrometer, the floating diffusion type of electrometer being favored for its low noise.

The floating-diffusion electrometer employs an insulated-gate field effect transistor (FET) with its gate electrode connected to a floating diffusion in a charge transfer channel. The FET has a conduction channel between its source and drain electrodes that has conductance proportional to the voltage at its gate, which is proportional to the magnitude of the charge packet under the floating diffusion. The FET conductance controls current flow through the FET conduction channel for determining the amplitudes of samples generated in the voltage or current regime as electrometer output.

The electrostatic coupling of clocking voltages to the gate electrode of the electrometer FET places voltage variations on that gate electrode which are appreciably large, as compared to the gate voltage induced responsive to the magnitude of the charge packet under the floating diffusion. As long as the clocking voltages coupled to the gate electrode of the electrometer FET recur regularly at the sampling rate at which the electrometer is operated, they heterodyne with the electrometer sampling rate to zero frequency and to harmonics of electrometer sampling rate in the video signal output taken from the CCD imager. Within the baseband, these portions of the frequency spectrum only affect the direct-voltage pedestal on which rides the video signal taken from the CCD imager. This pedestal is discarded in the normal black level clamping and dc-restoration processes in the video processing amplifier used after the CCD imager.

However, variation from the regular recurrence of clocking signal electrostatically coupled to the electrometer FET gate electrode, as occurs during a change in the one(s) of the line-transfer register charge transfer channels selected for forward clocking, heterodynes with the electrometer sample rate to cause disturbances in the baseband frequencies of the video signal and to generate spectra around the harmonics of electrometer sampling rate. This gives rise to undesirable line-selection artifacts in the video signal output. Line-selection artifacts attributable to selection of line-transfer register charge transfer channel(s) for forward clocking, appear as a diagonal line disturbance across television pictures derived from the video output signals of CCD imagers using side-loaded CCD shift registers to transfer charge packets from their line-transfer registers to charge sensing stages that employ floating-diffusion or floating-gate electrometers. This line-selection artifact problem has been described in detail by P. K. Weimer in his U.S. patent application Ser. No. 688,982, filed Jan. 4, 1985, entitled "REMOVAL OF LINE SELECTION ARTIFACTS FROM TRACE PORTIONS OF LINE TRANSFER CCD IMAGER OUTPUT SIGNALS", and assigned to RCA Corporation.

A portion of the diagonally disposed line-selection artifacts falls within line retrace intervals and does not disrupt the television picture that is painted on the kinescope screen during successive line trace intervals. Artifacts attributable to selection of line-transfer register charge transfer channels for forward clocking can be made to fall completely within the line retrace intervals. Ways of doing this in line transfer types of CCD imager are described by P. K. Weimer in U.S. patent application Ser. No. 688,982.

One way described by Weimer replaces the side-loaded CCD shift register with an end-loaded CCD shift register. This end-loaded CCD shift register has a charge transfer channel with an input port wide enough to connect to the parallel output ports of the line-transfer register charge transfer channels, and with an output port relatively narrow compared to its input port to boost the sensitivity of the electrometer connected thereafter. The charge transfer stages between the input and output ports of this charge transfer channel are sufficient in number to delay charge packets for a time interval longer than line trace interval, but shorter than 1H. The video response from a electrometer connected after this or end-loaded CCD shift register exhibits line-selection artifacts in a line that is perpendicular to line scan and, having no appreciable dimension along scan line, can be fitted entirely within line retrace intervals. There are limitations, imposed by the need for efficient charge transfer, on the rate at which the width of the charge transfer channel of the end-loaded charge transfer channel can converge. These limitations undesirably cause the end-loaded CCD shift register to take up appreciable area on the CCD imager die. Weimer overcomes this problem in part by partitioning the line-transfer register, apportioning its charge transfer channels among bands of adjacent charge transfer channels, and by using a separate end-loaded CCD shift register to connect the output ports of each band of line-transfer register charge transfer channels to the electrometer.

Weimer also describes in his patent application another way of placing the line-selection artifacts entirely within the line retrace intervals. It uses a variable-length clocked CCD delay line before the charge sensing stage of the CCD imager, to compensate for the differential delay introduced by using a parallelly loaded CCD imager.

The line selection artifacts are made to be in a line perpendicular to the direction of line scan, rather than skewed respective to the direction of line scan, in both these ways for putting line-selection artifacts entirely within line retrace intervals. Weimer avoids the use of side-loaded CCD shift registers, which give rise to a line of line-selection artifacts askew line scan, despite side-loaded CCD shift registers being a way of commutating charge packets out of the image register that is economical of imager die area and of clocking power.

In the prior art CCD imagers using line-transfer registers, the differential delay introduced by the side-loaded shift register is typically 240 or 480 pixel scan durations. This is because there are about 480 active lines in a television picture using a 525-line standard. The side-loaded CCD shift register has one charge transfer stage for each line-transfer register charge transfer channel or pair of adjacent line-transfer register charge transfer channels; and the clock rate of the side-loaded CCD shift register is the same as the selected line-transfer register charge transfer channel, which is forward clocked at pixel scan rate. The prior art imagers with line-transfer registers use only 200 to 400 pixels per line trace interval portion of line scan. Since line retrace interval is typically one sixth of 1H, line retrace interval is one-fifth the length of line trace in number of pixel durations. For a line trace interval of 200 to 400 pixel durations, line retrace interval is 40 to 80 pixel durations. So the diagonal line-selection artifact, 240 to 480 pixels wide in the direction of line scan, perforce extends past line retrace interval and over most of the active picture area described by the CCD imager output signal.

As time passes, however, the spatial resolution desired in CCD imagers increases. CCD imagers of the field transfer type have been proposed which have 768 pixels in each scan line trace portion. It is desirable to make the number of pixels per scan line a multiple of 192 for an NTSC camera since there are an integral number of pixels per cycle of the color subcarrier. (Favorable numbers of pixels per line trace interval exist for other color broadcast standards, such as PAL.) The trend is eventually to a standard of 1536 pixels per line trace interval. At the same time, the number of scan lines per frame may increase to 1050 or so in the television camera, even when only 525 lines are actually broadcast. With the trend towards higher resolution in CCD imagers, the line transfer type of imager becomes increasingly attractive.

Increasing the spatial resolution in the direction of charge transfer channel length is preferable to increasing it in the direction of charge transfer channel width, since the latter way of increasing resolution is accompanied by loss of charge handling capability to additional channel-stop and anti-blooming-drain structure. Furthermore, the increase in resolution along the length of the channel is governed by the degree of overlap of successive gates, rather than by gate electrode length per se, which puts less demand on the photolithographic processes determining pixel size. Accordingly, line transfer image registers facilitate increasing spatial resolution along the scan line direction, and they are to be preferred where the number of scan lines is not increased more than a very few times, in seeking to afford better resolution in the direction perpendicular to scan lines. The limitations of photolithography place constraints on the minimum pixel size in an imager; therefore, increasing the number of pixels per field tends to increase minimum imager size. So the smaller die size available with a line transfer imager becomes more important when one wishes to maximize the number of imagers per wafer of semiconductor material. It is easier to spatially multiplex the read-out of a line transfer imager, to bring out in parallel responses from different portions of the image register, than it is to spatially multiplex the read-out of a field transfer CCD imager or an interline transfer CCD imager transferring perpendicular to line scan. Such spatial multiplexing reduces clocking rates to reduce clocking signal dissipation that heats up the CCD imager.

The greater number of pixels per scan line trace interval increases the number of pixel durations in scan line retrace interval. There are approximately 154 pixel scan durations in line retrace when there are 768 pixel scan durations in line trace; and there are approximately 307 pixel scan durations line retrace when there are 1536 pixel scan durations in line trace. So a diagonal line artifact much wider in the line scan direction in terms of pixels scan durations can be accommodated in the line retrace intervals. Suppose one could shorten, by a small factor, the differential delay in a side-loaded CCD shift register used to transfer charge packets from the image register of a line transfer CCD imager to its electrometer. If the differential delay were shortened four times, for example, then the diagonal line-selection artifact could be caused to fall entirely within the line retrace intervals, in these line transfer CCD imagers with a large number of pixels per scan line.

The same is true for CCD imagers of horizontal interline transfer type. These CCD imagers are representative of a class of imager in which the line transfer register is not used as an image register, as in the line transfer CCD imager, but in which the line transfer register is used as a temporary field storage register. Although the mechanisms for putting charge packets into their line transfer registers are different in the line-transfer and horizontal-interline-transfer types of CCD imager, the problems of transferring the charge packets out of their line transfer registers to their charge sensing stages are identical.

It is also desirable to keep diagonal line artifacts out of line trace intervals in the video output signal from a horizontal-field-transfer type of CCD imager. In this type of imager the charge transfer channels in an image register are aligned parallel to, not perpendicular with, the direction of line scanning. Each charge transfer channel in the image register has its output port connected to the input port of a corresponding charge transfer channel in a line-transfer register. During field retrace intervals this type of imager transfers the field of charge packets, which were formed the previous field trace interval by photoconversion of image elements, from its image register into the line-transfer register, which is masked from light. The image register may be shuttered during field transfer to eliminate transfer smear. Then, during the ensuing field trace interval the line-transfer register is read in the same way as in the line-transfer type of imager.

The present inventor describes other ways of placing the line-selection artifacts entirely with line retrace intervals, in his U.S. patent application Ser. No. 824,556 entitled "CCD CIRCUITRY FOR LINE-SEQUENTIAL READ OUT OF A PHOTOSENSOR ARRAY", filed Jan. 23, 1986, and assigned to RCA Corporation. One way the present inventor describes replaces the one CCD shift register side-loaded in respective charge transfer stages from all the lines in the line-transfer register with a plurality of CCD shift registers each having a reduced number of charge transfer stages, each side-loaded in its respective charge transfer stages from only a restricted number of the lines in the image register. The number of lines side-loading each shift register is restricted sufficiently that the differential delay experienced by those lines is sufficiently small that the diagonally disposed line-selection artifacts fall entirely within line retrace intervals.

Another way the present inventor describes uses one output CCD shift register into which the charge transfer channels of the line transfer register successively clocked out their charge packets to be conveyed through the output CCD shift register to the charge sensing stage. The number of charge transfer stages in this output CCD shift register is reduced, replacing sets of short-length charge transfer stages with single long-length charge transfer stages, respectively. Each long-length charge transfer stage is loaded not from one image register charge transfer channel, but several of them. The output CCD shift register continues to be forward clocked at pixel scan rate, to advance charge packets one charge transfer stage per pixel read out from image register, but the reduced number of charge transfer stages in the output CCD shift register reduces the differential delay through it from its various side-loading input ports.

In this disclosure, the present inventor describes the reduction of differential delay through the output CCD shift register by increasing its forward clock rate from pixel scan rate to a multiple of pixel scan rate.

SUMMARY OF THE INVENTION

Certain types of CCD imager—e.g. the line transfer type—include a line-transfer register comprising a parallel array of charge transfer channels, each storing a succession of charge packets descriptive of a respective scan line of an optical image. The lines of charge packets are read out of the line-transfer register to side-load a CCD shift register which transports these charge packets to a charge sensing stage, typically an electrometer. As in prior art CCD imagers of this type, the number of stages in this CCD shift register is determined by the number of lines in the line-transfer register. In the present invention the side-loaded CCD shift register is not forward clocked at pixel scan rate, as is done in the prior art, but rather is forward clocked at a multiple at least two of pixel scan rate. The higher CCD shift register clock rate reduces differential delay through the CCD shift register, so artifacts of the line selection process in the line-transfer register, which appear in the raster-scanned video signal generated by the charge sensing circuitry, fall completely within line retrace intervals. This avoids the artifacts disrupting the picture response during line trace intervals, and it allows these artifacts to be suppressed by line retrace blanking.

DETAILED DESCRIPTION

Figure 1:
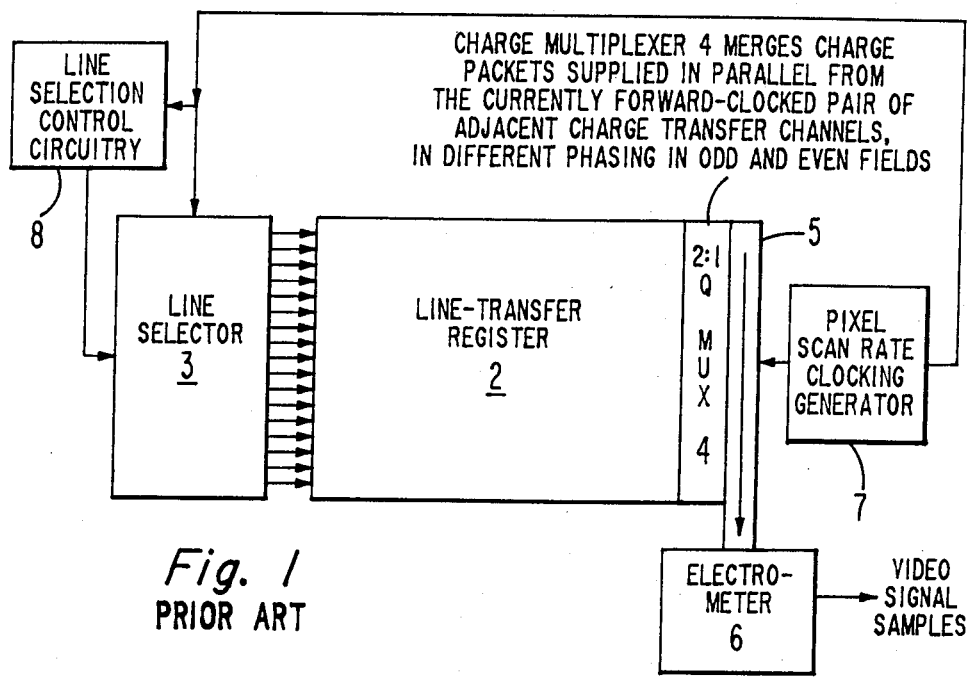
FIG. 1 is a block diagram schematic diagram of a line transfer CCD imager using a line-transfer register 2 as image register, as described by P. K. Weimer in U.S. Pat. No. 4,242,700 issued Dec. 30, 1980, entitled "LINE TRANSFER CCD IMAGERS", and assigned to RCA Corporation. This imager has an undesirable tendency to exhibit line-selection artifacts within line trace intervals, the problem which the present invention addresses. Arrows indicate direction of charge transfer in CCD shift register circuitry in the drawing.

In the FIG. 1 prior art CCD imager, a line-transfer register 2 comprises a parallel array of charge transfer channels, l in number, disposed in a substrate of semiconductive material. These charge transfer channels may be surface channels or buried channels, the latter generally being preferred because CCDs using buried channels are not affected by surface recombination noise. Since l is normally at least two hundred, these charge transfer channels are not explicitly shown in FIG. 1, so as not to clutter up the figure. But these charge transfer channels should be understood to have their lengths extending from left to right.

In a CCD imager of line transfer type the image integration process takes place within the charge transfer channels of line-transfer register 2. In solid state imagers of other types in which the invention finds use, such as the horizontal interline transfer type of CCD imager, line-transfer register 2 is used as a temporary field storage register into which charge packets are loaded during field retrace intervals from an array of photosensors (not shown in FIG. 1). The output ports of the charge transfer channels in line-transfer register 2 are in parallel alignment at the right edge of register 2 in FIG. 1. The charge transfer channels in line transfer register 2 are considered to be ordinally numbered first through $l^{th}$ in order of their disposition from the bottom of register 2 to its top as depicted in FIG. 1. Generally, in a line transfer type of imager, inverting optics are used to project the radiant energy image into line transfer register 2, so the topmost and bottom-most parts of the television picture, reconstructed from video signal samples generated by the FIG. 1 imager, will be constructed from charge packets respectively accumulated in the first and the $l^{th}$ charge transfer channels. The convention of line scan of the field of view of the camera proceeding from top to bottom is presumed to be followed. Line selector 3 supplies line selection signals for successively forward clocking the odd-numbered charge transfer channels in line-transfer register 2 during each odd-numbered image field scan, in order of progressively higher ordinal numbering. During each even-numbered field scan, line selector 3 supplies line selection signals for successively forward clocking the even-numbered charge transfer channels in line-transfer register 2, in order of progressively higher ordinal numbering. This provides line interlace from field to field in transferring, from line-transfer register 2, charge packets with amplitudes descriptive of pixel intensity.

Line selector 3 is depicted as supplying only sixteen line selection signals to line-transfer register 2, to forward clock respective ones of its charge transfer channels. But these sixteen line selection signals are to be considered representative of as many line selection signals as the number, l, of parallelled charge transfer channels in line-transfer register 2. In a CCD imager for a 525-line television standard, l is typically 480, which is too great a number of line selection signals to show in a drawing figure.

In a line transfer CCD imager as described by P. K. Weimer in U.S. Pat. No. 4,242,700, the photoconversion of the elements or pixels of a radiant energy image projected into its line-transfer register 2 takes place in the line transfer register charge transfer channels themselves, and in the semiconductor substrate in which they are formed. These photocharges are accumulated into charge packets in potential energy wells induced by static potentials applied to the gate electrodes crossing the line-transfer register 2 charge transfer channels that line selector 3 does not currently select for application of forward clocking signal. Irradiation may take place from the "front" surface (on which the gate electrodes used to transfer charge packets in the image register charge transfer channels are formed), particularly if the gate electrodes are transparent to the radiant energy of interest. Or if the substrate of semiconductive material is thinned, irradiation may take place through the opposing, "back" surface.

Also known is another, related, interline sensor type of CCD imager which also uses a line-transfer register. However, in this related type of CCD imager photoconversion takes place in linear arrays of photoelements, either interlineated between the line-transfer register 2 charge transfer channels or disposed over them. Prior to each line-transfer register 2 charge transfer channel being forward clocked, it is loaded in parallel with charge packets from the associated line array of photoelements, responsive to the pulsing of a transfer gate between the line array of photoelements and the charge transfer channel. The invention disclosed herein is applicable whether line-transfer register 2 is in a CCD imager of the line transfer type, or is in a CCD imager of a related type.

U.S. Pat. No. 4,242,700 shows its line-transfer register 2 followed by a rank 4 of charge packet multiplexers which reduce the l parallel outputs of the line-transfer register 2 charge transfer channels to l/2 inputs for side-loading the respective successive stages of a side-loaded CCD shift register 5. CCD shift register 5 is forward clocked in synchronism with the one of line-transfer register 2 charge transfer channels that line selector 3 selects for forward clocking. The charge packets serially transfer, from the selected line-transfer register 2 charge transfer channel, through one of the charge packet multiplexers in rank 4 to side-load CCD shift register 5, through CCD shift register 5 in its forward clock direction to its output port, and to the electrometer 6. Electrometer 6 senses the amplitudes of the charge packets serially transferred to it and responds to supply video signal samples in the current or voltage regime.

A pixel scan rate clocking generator 7 supplies pixel scan rate clocking signal to CCD shift register 5 to forward clock the register. Clocking generator 7 also supplies pixel scan rate clocking signal to line selector 3, which applies that clocking signal to selected charge transfer channels in line-transfer register 2. Clocking generator 7 also supplies pixel scan rate clocking signal to line selection control circuitry 8 which generates line selection control signals for controlling line selector 3. This generation is performed by frequency division techniques familiar to those who design television synchronizing generators.

Line selector 3 supplies a forward clocking signal to line-transfer register 2 continuously, though to different pairs of adjacent charge transfer channels in the line-transfer register 2 at different times. (Discontinuously supplying forward clocking signals from line selector 3 can be done, but it is disadvantageous in that it generates more than one line selection artifact to take care of.) If the change in the application of the forward clocking signal from one pair of adjacent charge transfer channels to the next pair took place at 1H intervals, the differential delay afforded to successive lines of charge packets by side-loaded CCD shift register 5 (owing to these lines of charge packets being loaded into different ones of register 5 charge transfer stages) gives rise to shear distortion in a television picture reconstructed from the video signal samples supplied by electrometer 6.

Figure 2:
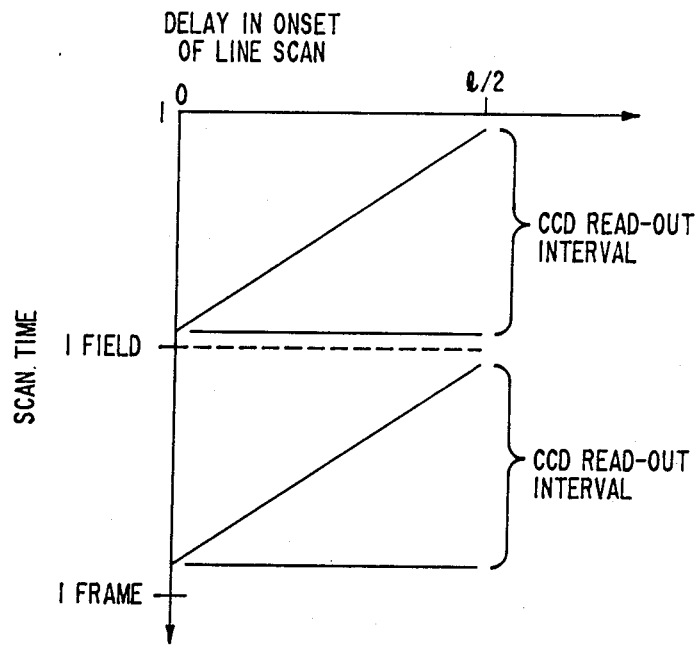
FIG. 2 depicts a characteristic of the line selection control circuitry 8 used in the FIG. 1 CCD imager to avoid shear distortion in its video signal.

FIG. 2 shows how the line selector 3 is made to compensate against this shear distortion. The onset of forward clocking is delayed from the normal beginning of the line scan for each line scan of the picture portions of each field. Normal beginnings of line scan would be at 1H intervals. The delay for the first row read out is made to be l/2 forward clock cycles, to equal that delay the last line scan in the picture portion of that field experiences in its passage through the entire length of side-loaded CCD shift register 5. This delay in onset of forward clocking during first line scan is decremented with each successive line of the field. That is, the spacing in time between onsets of forward clocking of the successive lines of the field is one forward clock cycle less than the number of clock cycles in a 1H duration.

The larger number l of lines in the line-transfer imager 2 makes it difficult to show in FIG. 2 a one-half line offset in the delay of onset of line scan between the first and second fields, but one should note this. One should also be aware that the Weimer line-transfer imager described in U.S. Pat. No. 4,242,700 provides pseudo line interlace from field to field rather than true line interlace. That is, the image register is completely read out in paired rows during each field, with pair phasing staggered in alternate fields.

Consider now the extent of the line-selection artifacts in the direction of scan line in the FIG. 1 imager, assuming 480 active scan lines per frame. The charge packet multiplexers in rank 4 reduce to 240 the number of side-loaded successive charge transfer stages in CCD shift register 5. So the diagonally disposed line-selection artifacts extend 240 pixel widths in the scan line direction. If the line trace interval scan is 403 pixel widths, the present day standard, line retrace interval corresponds to about 81 pixel widths; and clearly the 240 pixel widths dimension of the diagonally disposed line-selection artifacts cannot be contained within the line retrace intervals. The diagonally disposed line-selection artifacts will extend in the line scan direction across at least two-fifths of the television picture reconstructed from the FIG. 1 CCD imager video signal samples. If 768 pixel widths are scanned in the line trace interval, line retrace interval corresponds to about 154 pixel widths; and the diagonally disposed artifacts will extend in line scan direction over only about a twelfth of the picture.

If 1536 pixel widths are scanned in the line trace interval, line retrace interval corresponds to is about 307 pixel widths. So, the line-selection artifacts will be located entirely within line retrace intervals. The problem is, if resolution in the scan line direction is increased to this degree, it is usually desirable to increase the number of scan lines to afford commensurately increased resolution in the direction perpendicular to scan line direction. As a matter of practicality, then, one must consider ways to further reduce the maximum differential delays in the side-loaded CCD shift registers used to commutate charge packets out of line transfer registers.

Figure 3:
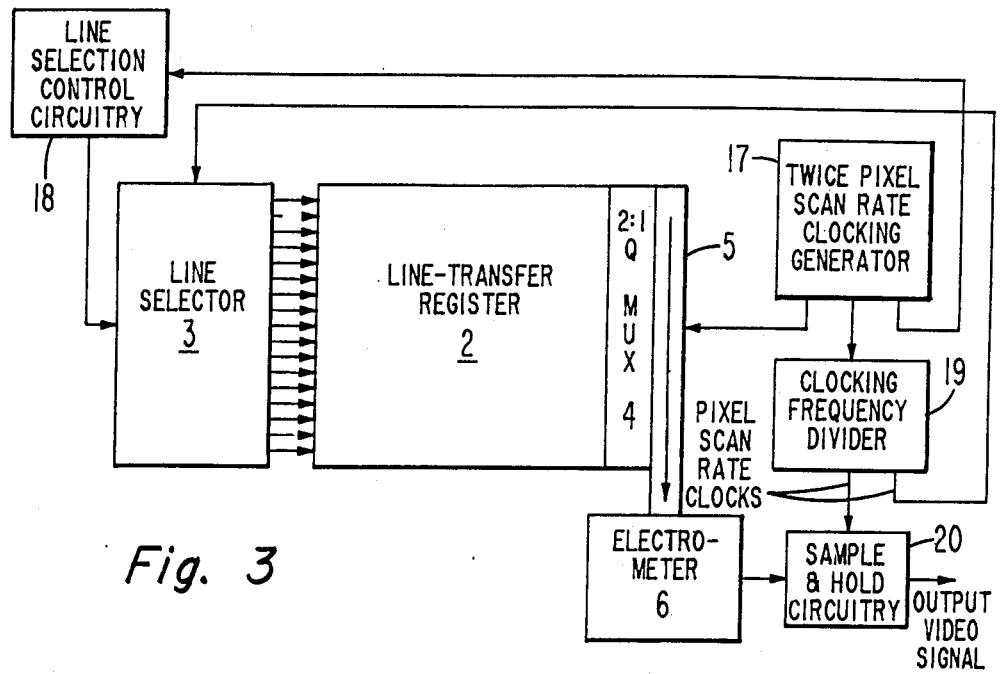
FIG. 3 is a block schematic diagram of a line transfer CCD imager embodying the invention.

FIG. 3 shows a modification of the FIG. 1 CCD imager in which the side-loaded CCD shift register 5 is forward clocked at twice the pixel scan rate at which charge packets are transferred from line-transfer register 2. This halves the time required to clock a charge packet from the beginning of CCD shift register 5 to electrometer 6. So the diagonally disposed line-selection artifacts extend only half so far in the scan line direction—i.e. 120 pixel widths. If 768 pixel widths are scanned in the line trace interval, the corresponding 154 pixel widths of line retrace interval will contain the entirety of the diagonally disposed line-selection artifacts. These line-selection artifacts will, then, be suppressed by line retrace blanking.

A twice-pixel-scan-rate clocking generator 17 supplies forward clocking signals to side-loaded CCD shift register 5 in FIG. 3. Clock generator 17 also supplies clocking signals to line selection control circuitry 18. A frequency dividing circuitry 19 divides the frequency of clocking signals from clock generator 17 by two to provide pixel scan rate clocking signals to line selector 3 for application to selected charge transfer channels in line-transfer register 2. Frequency dividing circuit 19 also supplies pixel scan rate pulses to sample-and-hold circuitry 20 for subsampling electrometer 6 response samples and holding each subsample to generate video signal.

Figure 4:
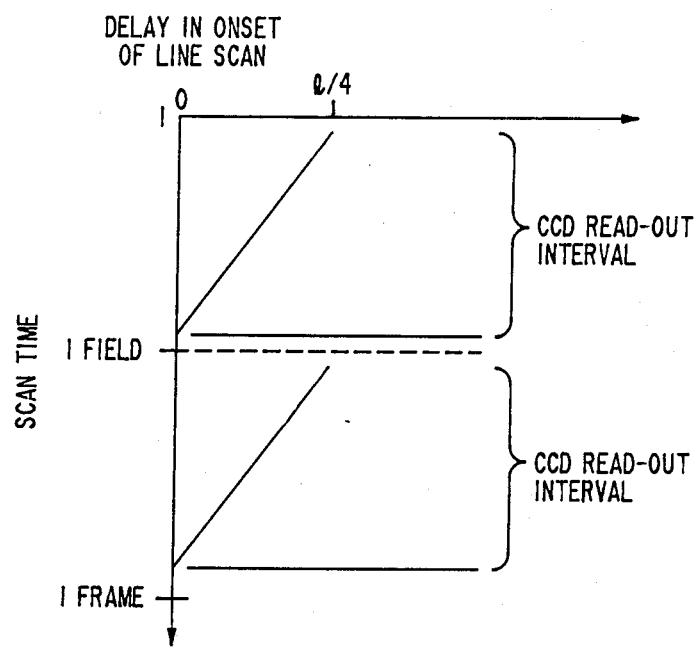
FIG. 4 is a block schematic diagram of the line selection control circuitry 18 used in the FIG. 2 CCD imager to avoid shear distortion in its video signal.

FIG. 4 shows how line selection control circuitry 18 delays the onset of line scan decrementing from a value 1/4, where 1 is the number of lines per frame. This is done in consideration of the differential delay through CCD shift register 5 being halved, and halves the width of the diagonal line-selection artifacts in the direction of line scan.

If the line retrace interval is 403 pixel widths, the present day standard, FIG. 2 imager may be modified so that the side-loaded CCD shift register 5 is forward clocked at three times the pixel scan rate at which charge packets are transferred from line-transfer register 2. This reduces the diagonally disposed line artifacts to eighty pixel widths extension in the direction of line scan, which will just fit within the line retrace interval of eighty-one pixel widths. In this modification twice-pixel-scan-rate clocking generator 17 is replaced by a thrice-pixel-scan-rate clocking generator, frequency dividing circuitry 19 is replaced by frequency dividing circuitry that divides clocking signal rates by three rather than two, and line selection control circuitry is appropriately modified.

One skilled in the art of solid-state imager design and acquainted with the foregoing disclosure will be enabled to design many imagers embodying the invention.

The invention can be employed with CCD imagers as described in the present inventor's U.S. patent application Ser. No. 824,556 filed Jan. 23, 1986, for example.

Shear distortion may be corrected not by advancing the onset of line scan in the line selector 3 one pixel per line, but rather by using a variable-length delay subsequent to the imager. Shortened differential delay in CCD shift register 5 is still required to avoid the line selection artifact falling outside line retrace intervals.

The sample-and-hold circuitry in the FIG. 3 CCD imager may be proceeded by high-pass or band-pass filtering to suppress flicker noise. Then low-frequency image response may be obtained by synchronous detection of the filter response at CCD register 5 clock rate or a harmonic thereof.

While line-transfer register 2 is normally clocked with only one phase of changing clock voltage, it is advantageous to forward clock shift register 5 with dual-phase or polyphase clocking to improve transfer efficiency at the higher clocking rate.

The alternate samples of electrometer 6 response, responsive to "empty" positions in CCD shift register 5 output may be used to provide black level samples rather than being simply discarded. This is particularly advantageous to do when "fat zero" bias charge packets are inserted in the input end of CCD shift register 5 (remote from its output end at which electrometer 6 connects). These bias charge packets reduce lag effects for weak photoresponse as may otherwise occur in the rapidly clocked CCD shift register 5. Black level samples are available at pixel scan rate, which allows individual pixels to be dc-restored. This is advantageous in avoiding line streak noise. The reader is referred to P. A. Levine's U.S. Pat. No. 4,549,215 issued Dec. 31, 1985 and entitled "LOW NOISE BLACK LEVEL REFERENCE FOR CCD IMAGERS".

A single CCD shift register may be used to time-division multiplex the outputs of two line transfer registers, one either side of it to a common electrometer stage at the output end of that register. This is useful, for example, in apparatus for comprising two side-by-side images. Such comparisons may be made to detect movement between different image sampling times, for example.

What is claimed is:

1. A method of reducing differential time delay between the responses at the output end of a serially side-loaded CCD shift register for input signals serially side-loaded at a first rate into different stages of a said CCD shift register, said method comprising the steps of:
    forward clocking said CCD register at a second rate, said second rate being at least twice said first rate; and
    subsampling at said first rate the responses at the output end of said CCD register.

2. A method for operating a solid state imager of the type having a line transfer register, means for selectively reading out lines of charge packets descriptive of photoconversion response from said line transfer imager at a pixel scan rate, a CCD shift register serially side-loaded in respective ones of its charge transfer stages by respective lines of said line transfer imager, and a charge sensing stage at the output end of said CCD shift register to which line selection artifacts undesirably tend to couple, said method being used for placing line selection artifacts within line retrace intervals of the imager output signal from said charge sensing stage and comprising the steps of:

forward clocking said CCD shift register at a second rate at least twice said pixel scan rate; and subsampling the ouptput of said charge transfer stage at said pixel scan rate to recover response of that stage to photoconversion response.

3. An imager comprising:

a line-transfer register having a plurality of charge transfer channels with respective output ports;

a CCD shift register having a plurality of successive charge transfer stages preceding an output end thereof, said successive charge transfer stages having respective serially side-loaded connections from output ports of said line-transfer register:

an electrometer having its input port connected at the output end of said CCD shift register, and having an output port;

means for generating pixel scan rate clock signals;

means for selectively applying said pixel scan rate clock signals to each charge transfer channel in said line-transfer register;

means for generating clock signals at a relatively high rate that is at least twice the rate of said pixel scan rate clock signals; and means for clocking said CCD shift register with said relatively high rate clock signals to advance the contents of its successive charge transfer stages seriatim to said electrometer input.

4. An imager as set forth in claim 3 including sampling means responsive to said pixel scan rate clock signals for sampling signal supplied from said electrometer output port.

5. An imager as set forth in claim 4 including means for holding each successive sample taken by said sampling means until the next is taken.

* * * * *